United States Patent
Knowles et al.

(10) Patent No.: US 11,660,535 B2
(45) Date of Patent: May 30, 2023

(54) HARDWARE ACCELERATION AND EVENT DECISIONS FOR LATE LATCH AND WARP IN INTERACTIVE COMPUTER PRODUCTS

(71) Applicant: Nvidia Corporation, Santa Clara, CA (US)

(72) Inventors: Pyarelal Knowles, Santa Clara, CA (US); Ben Boudaoud, Santa Clara, CA (US); Josef Spjut, Santa Clara, CA (US); Morgan McGuire, Santa Clara, CA (US); Kamran Binaee, Santa Clara, CA (US); Joohwan Kim, Santa Clara, CA (US); Harish Vutukuru, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 287 days.

(21) Appl. No.: 16/942,951

(22) Filed: Jul. 30, 2020

(65) Prior Publication Data
US 2021/0106912 A1    Apr. 15, 2021

Related U.S. Application Data

(60) Provisional application No. 62/914,154, filed on Oct. 11, 2019.

(51) Int. Cl.
*A63F 13/428*    (2014.01)
*G06T 3/00*    (2006.01)
(Continued)

(52) U.S. Cl.
CPC ............ *A63F 13/428* (2014.09); *G06F 3/011* (2013.01); *G06T 3/0093* (2013.01); *G06T 3/60* (2013.01);
(Continued)

(58) Field of Classification Search
None
See application file for complete search history.

(56) References Cited

U.S. PATENT DOCUMENTS

| 6,415,317 B1 * | 7/2002 | Yelon | A63F 13/12 |
| | | | 719/329 |
| 2012/0299940 A1 * | 11/2012 | Dietrich, Jr. | H04N 19/61 |
| | | | 345/522 |

(Continued)

OTHER PUBLICATIONS

Wolberg et al. "Separable Image Warping with Spatial lookup tables", computer Graphics, vol. 23 No. 3, 1989 (Year: 1989).*
(Continued)

*Primary Examiner* — Yingchun He

(57) ABSTRACT

The disclosure provides features or schemes that improve a user's experience with an interactive computer product by reducing latency through late latching and late warping. The late warping can be applied by imaging hardware based on late latch inputs and is applicable for both local and cloud computing environments. In one aspect, the disclosure provides a method of operating an imaging system employing late latching and late warping. In one example the method of operating an imaging system includes: (1) rendering a rendered image based on a user input from an input device and scene data from an application engine, (2) obtaining a late latch input from the input device, (3) rendering, employing imaging hardware, a warped image by late warping at least a portion of the rendered image based on the late latch input, and (4) updating state information in the application engine with late latch and warp information.

27 Claims, 6 Drawing Sheets

(51) Int. Cl.
*G06T 5/50* (2006.01)
*G06F 3/01* (2006.01)
*G06T 15/00* (2011.01)
*G06T 3/60* (2006.01)

(52) U.S. Cl.
CPC .............. *G06T 5/50* (2013.01); *G06T 15/005* (2013.01); *A63F 2300/6045* (2013.01); *G06T 2207/20221* (2013.01)

(56) References Cited

U.S. PATENT DOCUMENTS

| | | | |
|---|---|---|---|
| 2017/0200254 A1* | 7/2017 | Kopf | H04L 67/01 |
| 2018/0053284 A1* | 2/2018 | Rodriguez | G06T 5/006 |
| 2018/0165878 A1* | 6/2018 | Khan | G06T 19/006 |
| 2021/0067844 A1* | 3/2021 | Binder | H04N 21/8456 |

OTHER PUBLICATIONS

Lee, et al.; "Outatime: Using Speculation to Enable Low-Latency Continuous Interaction for Mobile Cloud Gaming"; MobiSys '15, Florence Italy; May 18-22, 2015; http://dx.doi.org/10.1145/2742647.2742656; 15 pgs.

* cited by examiner

HARDWARE ACCELERATION AND EVENT DECISIONS FOR LATE LATCH AND WARP IN INTERACTIVE COMPUTER PRODUCTS

CROSS-REFERENCE TO RELATED APPLICATION

This application claims the benefit of U.S. Provisional Application Ser. No. 62/914,154, filed by Pyarelal Knowles, et al. on Oct. 11, 2019, entitled "HARDWARE ACCELERATION AND GAME EVENT DECISION FOR LATE LATCH AND WARP IN GAMING," commonly assigned with this application and incorporated herein by reference in its entirety.

TECHNICAL FIELD

This disclosure is directed, in general, to interactive entertainment and, more specifically, to improving a user's experience with interactive computer products, such as video games.

BACKGROUND

Computers can be used to simulate a scene and the interaction of a user with objects in the scene. For example, a computer can execute a video game and simulate the interaction of a user with various objects in different scenes of the video game. Using computers, however, to realistically simulate a scene and a user's interaction can be a challenging task. This is especially true when the computer attempts to render a scene based on the user's latest interaction with objects in a scene. The rendering pipeline as a whole can be long, and introduces a simulation delay that negatively affects the user's experience with a video game or other interactive computer product.

SUMMARY

In one aspect, the disclosure provides a display. In one example, the display includes:
(1) a screen for displaying a screen image and (2) imaging hardware configured to generate a warped image by warping a rendered image based on a late latch input, wherein the screen image includes the warped image.

In another aspect, the disclosure provides a method of rendering employing imaging hardware proximate a display. In one example the method includes: (1) receiving, at the imaging hardware, a rendered image based on a user input from an input device and scene data from an application engine, (2) receiving, at the imaging hardware, a late latch input from the input device, and (3) rendering, by the imaging hardware, a warped image by warping at least a portion of the rendered image based on the late latch input.

In yet another aspect, the disclosure provides a method of operating an imaging system employing late latching and late warping. In one example the method of operating an imaging system includes: (1) rendering a rendered image based on a user input from an input device and scene data from an application engine, (2) obtaining a late latch input from the input device, (3) rendering, employing imaging hardware, a warped image by late warping at least a portion of the rendered image based on the late latch input, and (4) updating state information in the application engine with late latch and warp information.

In still another aspect, the disclosure provides a method of displaying scenes of a video game to improve a user's experience while playing. In one example, the method of displaying including: (1) creating a new scene of a video game, for display on a screen, using a computer and a first input from a user that is playing the video game, (2) receiving a second input from the user during the creating of the new scene, (3) adjusting the new scene using the second input from the user and a circuit located proximate the screen, (4) displaying the adjusted scene on the screen, and (5) updating information about the video game using the second input and the adjusted scene.

BRIEF DESCRIPTION

Reference is now made to the following descriptions taken in conjunction with the accompanying drawings, in which.

Figure 6:
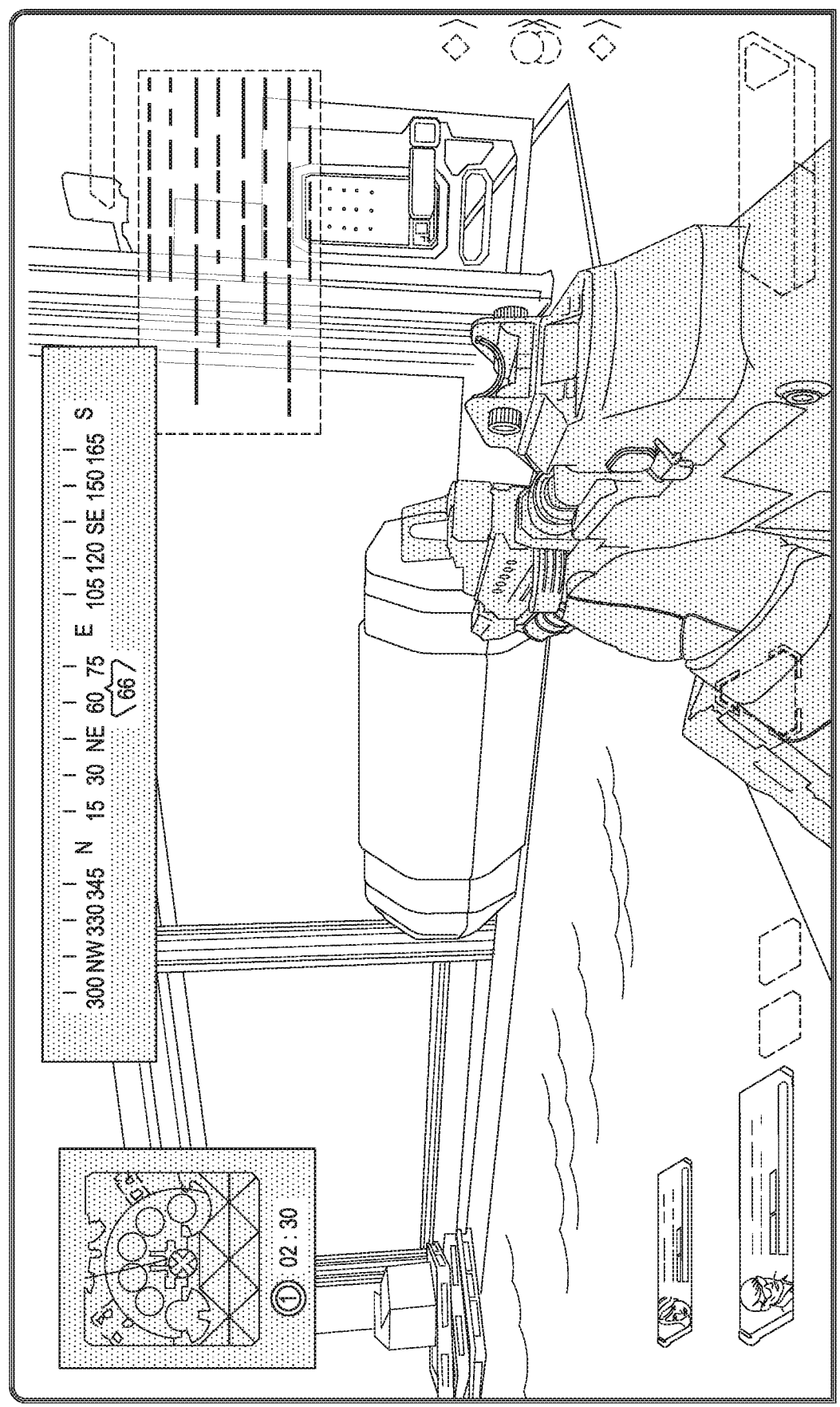
Figure 7:
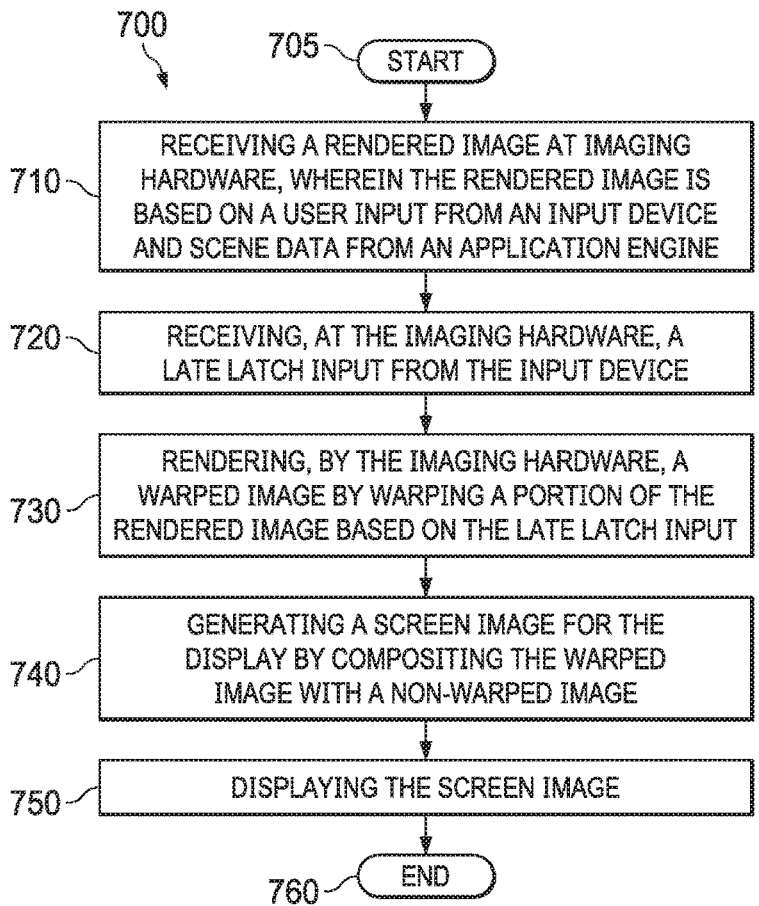
Figure 8:
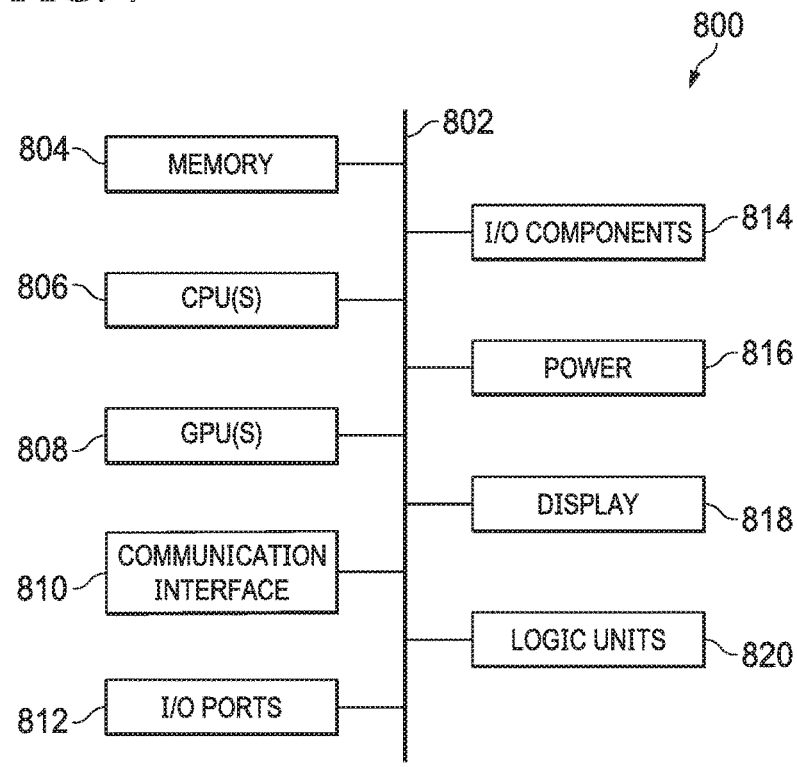
Figure 9:
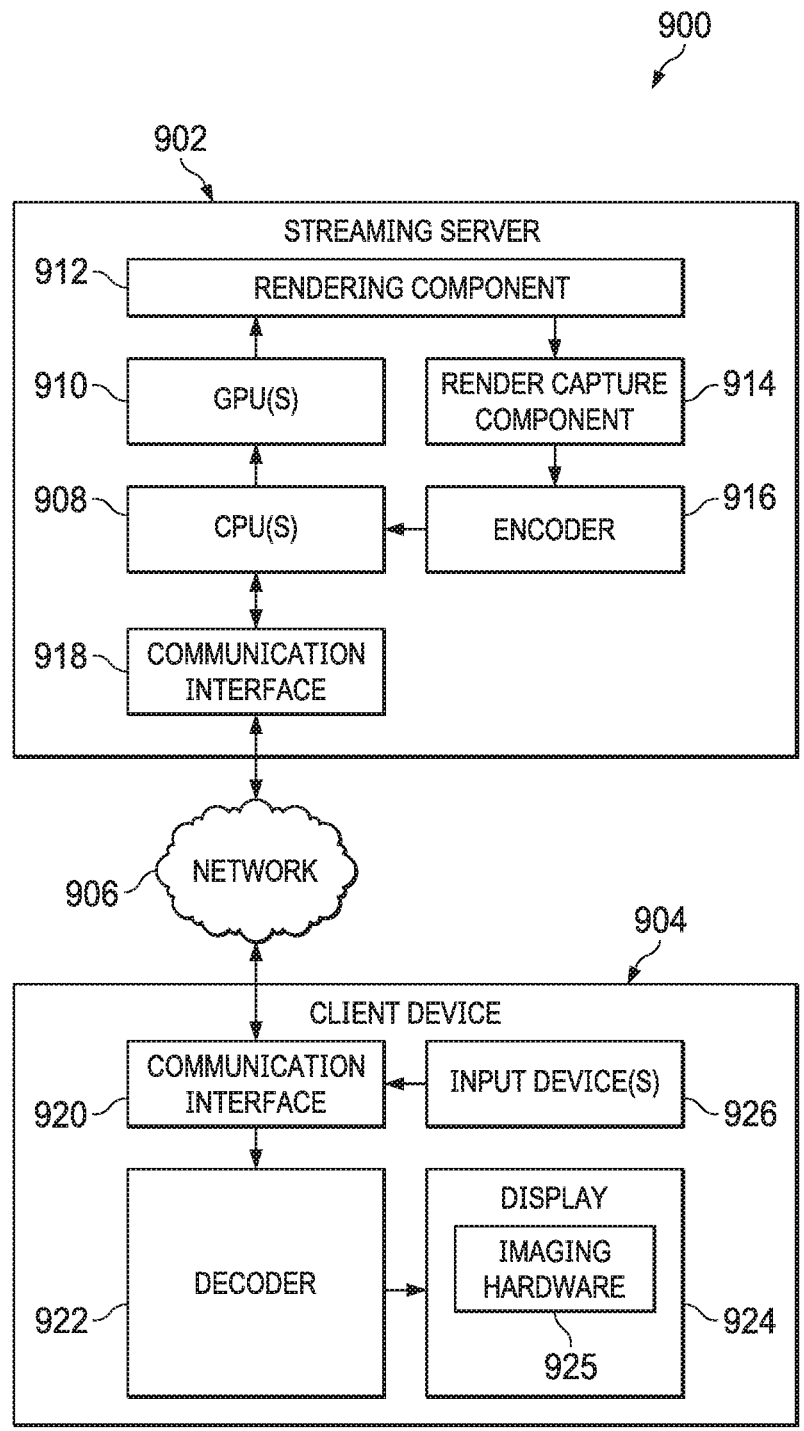

FIG. 6 provides an example of a screen image of a video game that has 3D content and 2D content;

FIG. 7 illustrates a flow diagram of an example method of rendering a screen image employing late warping carried out according to the principles of the disclosure;

FIG. 8 illustrates a block diagram of an example of a computing device suitable for use in implementing at least a portion of some embodiments of the disclosure; and FIG. 9 illustrates a system diagram of an example of a streaming system, in which at least a portion of some examples disclosed herein can be implemented.

DETAILED DESCRIPTION

While participating in interactive computer products, such as video games or other applications, users react to scenes presented on the screen of a display. When there is a long latency between a user's input and presentation of images on the screen, in both local and cloud environments, a user's performance can deteriorate. In a cloud environment, latency can be from a streaming network and local computing system that includes a local client device and the display. In a local environment, latency can still be the result of the local computing system latency but can also depend of the netcode of the interactive computer product. This high, end-to-end latency experienced in interactive computer products can negatively affect a user's experience and limit their desire to participate.

For an improved user's experience, the disclosure provides a system, apparatus, method, and/or scheme that reduces latency by applying late latching and late warping to a rendering pipeline that is applicable for both local and cloud environments. The late warping methods can be applied in hardware for reducing end-to-end latency on processors and displays. The late warping can be performed by imaging hardware based on a late latch input. Advantageously, the imaging hardware can be located proximate the display used for viewing. Proximate as used herein means the imaging hardware is located in a local client computing device connected to the display and an input device providing the late latch input, or located in the display itself. The imaging hardware, for example, can be integrated with the driver board of the display. By moving the imaging hardware closer to the screen used for displaying images, cloud-based rendering can be employed and last moment changes captured by late latching can be made before displaying to provide a more meaningful and playable end user experience. Late warping can also be seen as a correction for ignoring optimization and as a cost saving measure.

Late latching is sampling a user input or inputs later in the image generation/presentation pipeline, such as in the late stages of a rendering pipeline. As such, a late latch input is a user input provided from a user input device at a later time than the user input previously provided to a rendering engine, or renderer, for rendering. Rendering is synthesizing images, or creating images, by generating the images from a 2D or 3D model using a computer program. A "late latch" can be any input that happens after the main effort of generating the response to the initial input has begun. Accordingly, a late latch could happen almost the instant the process begins to consume the previous input. For example, a typical input-output latency for cloud gaming is about 100 ms or greater and 30 ms or greater for local gaming. Employing a late-latch input can reduce the input-output latency in the range of 5-20 ms for both cloud and local gaming; this latency is essentially limited by display device latency. "Warping" is generally defined as transforming an image or frame, or a portion thereof, by mapping positions in one image plane to positions in another image plane and filling holes, or missing information, when the warping reveals regions of the underlying content that was not seen in the original image. The image can be one of multiple images of a video stream. Late warping is applying image operations to generate a new rendered image reflecting a user input, such as a late latch input, received during the later stages of the image generation/presentation pipeline. Late warping, such as used in this disclosure, is an example of warping that provides late corrections to images before being displayed. Late warping takes an image, or set of images, which were generated with older input data, and manipulates their content based on newer input to synthesize a novel image or set of images. The images can be rendered images.

Using a Head Mounted Display (HMD) and orientation as an example, the view direction of an image being displayed changes as a user rotates their head regardless if the user is moving, such as moving forward or backward. For rendering the image, the latest possible head orientation is advantageously used. Rendering and then displaying the image can take about 20 milliseconds. As such, by the time the image is displayed on the screen, the head orientation information used for rendering is 20 milliseconds old. With late warping, the latest head orientation is obtained and then the image is warped based on the latest head orientation. The entire image does not need to be re-rendered; a portion of the image can be warped to correct for the last 20 milliseconds of change in the head orientation. A late latch input, for example, can be obtained 1 to 2 milliseconds before scanout, which can be approximately 10 milliseconds after the initial rendering begins at 90 Hz.

As noted above, a video game is an example of an interactive computer product and is used as an example throughout the disclosure of such products to discuss the latency solutions provided by the disclosure. An interactive computer product is a computer application, i.e., a computer program product, which involves the interaction of a user with an input device or devices to create a visual feedback on a display. An input device is a user interface device communicatively coupled to a computer that facilitates a user interacting with the computer or scenes provided on a screen associated with the computer. An input device can control a cursor of other objects within a scene. Examples of an input device include a mouse, a touch or scroll pad, an accelerometer, a gyroscope, or another device that reports a user's body orientation, view direction, angular rate, etc., such as associated with a HMD, and controllers that are specific input devises for certain types of an interactive computer product or for a single interactive computer product. A controller can be a hand controller, gun, a steering wheel, a yoke or control wheel, etc. Different inputs can be received from a single input device, such as mouse clicks and mouse rotations, and one or more inputs from an input device can be designated for late latch inputs.

A display is an electronic device that is designed and constructed, i.e., configured, for the visual presentation of data. A display includes a screen and the visual data is provided on the screen. A display can be a single device, such as a monitor, that is separate from a computing device, i.e., a computer, which provides the data for visual presentation. A display can also be integrated with the computing device, such as with a laptop, which provides the data for visual presentation. The display can be a video display device, such as a virtual reality (VR) headset, a gaming device, a smart phone, a television screen, a computer monitor, a projector, a holographic display, or another type of device that has a screen or screens for displaying video.

In addition to employing late warping methods in imaging hardware, the disclosure also employs late warping results for event evaluations of an interactive computer product, such as game event evaluations. For example, the translation and rotation inputs of a user's 3D view as defined in a final image a user sees can be paired when evaluating game events. In the case of late warping for viewer rotation without translation, the paired inputs can be the translation input used for rendering the image and the rotation input used for the late warping. Thus, the rotation input and the translation inputs that are used for game event evaluations can be from different time points. Accordingly, the disclosure also provides event evaluation, referred to as event decisions, in the presence of late warping that is consistent with a user's view and the user's interaction with the scene.

Image-based modification using late warping and late latching typically happen after a state of an application, such as a game state, is calculated. These image modifications can affect user experience, especially when the user is performing precision tasks based on vision, e.g. aiming tasks in shooter games. In such cases, additional transmission and processing of late latching and late warping data can be employed to update state information of an interactive computer product and to decide events, such as game events, based on the knowledge about these late modifications. An application engine can calculate states based on the set of user inputs used for late warping. Late warping disclosed herein can use translation and rotation inputs made at different time points or that are from the same time points. Event decisions can be made using the same coupling of translation and rotation input used when late warping. The choice of which time stamp to use for state calculations (e.g., time stamp for translation or rotation inputs) can depend on the philosophy of application designers and nature of a task under consideration. In addition to the rotation and translation, an application state is also composed of other component states. Each other state component could use either the same time as one or other of the inputs, or could use the time of the initial image render, in how the late warp produces the final image.

The disclosure recognizes the difference between compensating for translation versus orientation. With orientation, there is the re-arranging of pixels in the scene. With translation, objects can be at different distances and some pixels can be occluded. Pixel filling or discarding may therefore be necessary when late warping for translation. In some examples, additional information can be embedded in the images or multiple layered images can be rendered, and then compensating for translation can be performed. In other examples, the disclosure provides a coupling of old translation and new rotation inputs.

In video games, rotation is important because this is what is done when aiming to shoot and latency in the aiming mechanism can negatively affect play and performance; it can be the critical factor for gamer's performance in games. In some examples, a gamer's performance can be affected more than the amount of latency being compensated for by the features of this disclosure. Errors from small latency values (10 ms) are often amplified by game mechanics and human perception-action time required to correct for mistakes.

Even though the translation input may be older or newer than the rotational input, the pairing can be used to reconstruct what the user saw while performing gaming tasks. The pairing enables an event decision that is consistent with what the user actually saw. As such, the simulated rotation or position can be updated before an event decision is made. Thus, a decision on whether a shot is either a hit or a miss can be based on updated information to provide an improved gaming experience for a user.

Figure 4:
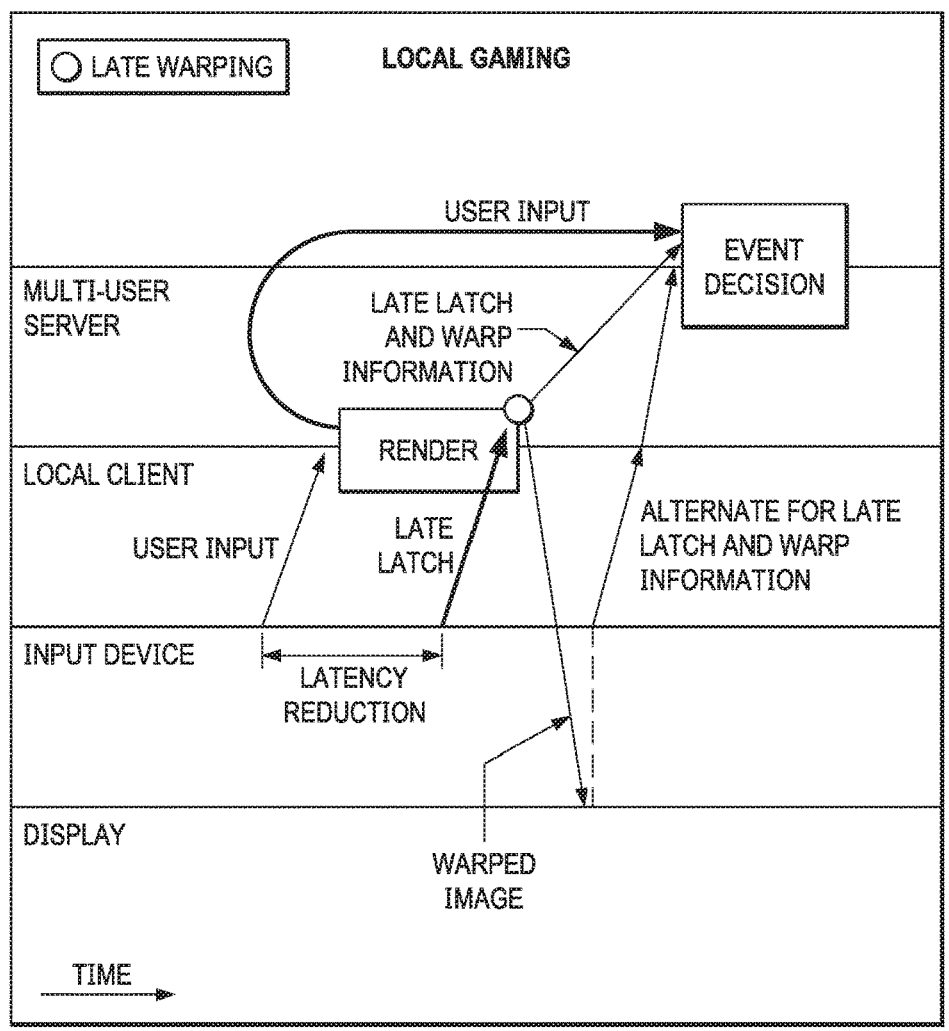
FIG. 4 illustrates a local gaming configuration of an imaging system for performing late warping according to the principles of the disclosure.
Figure 5:
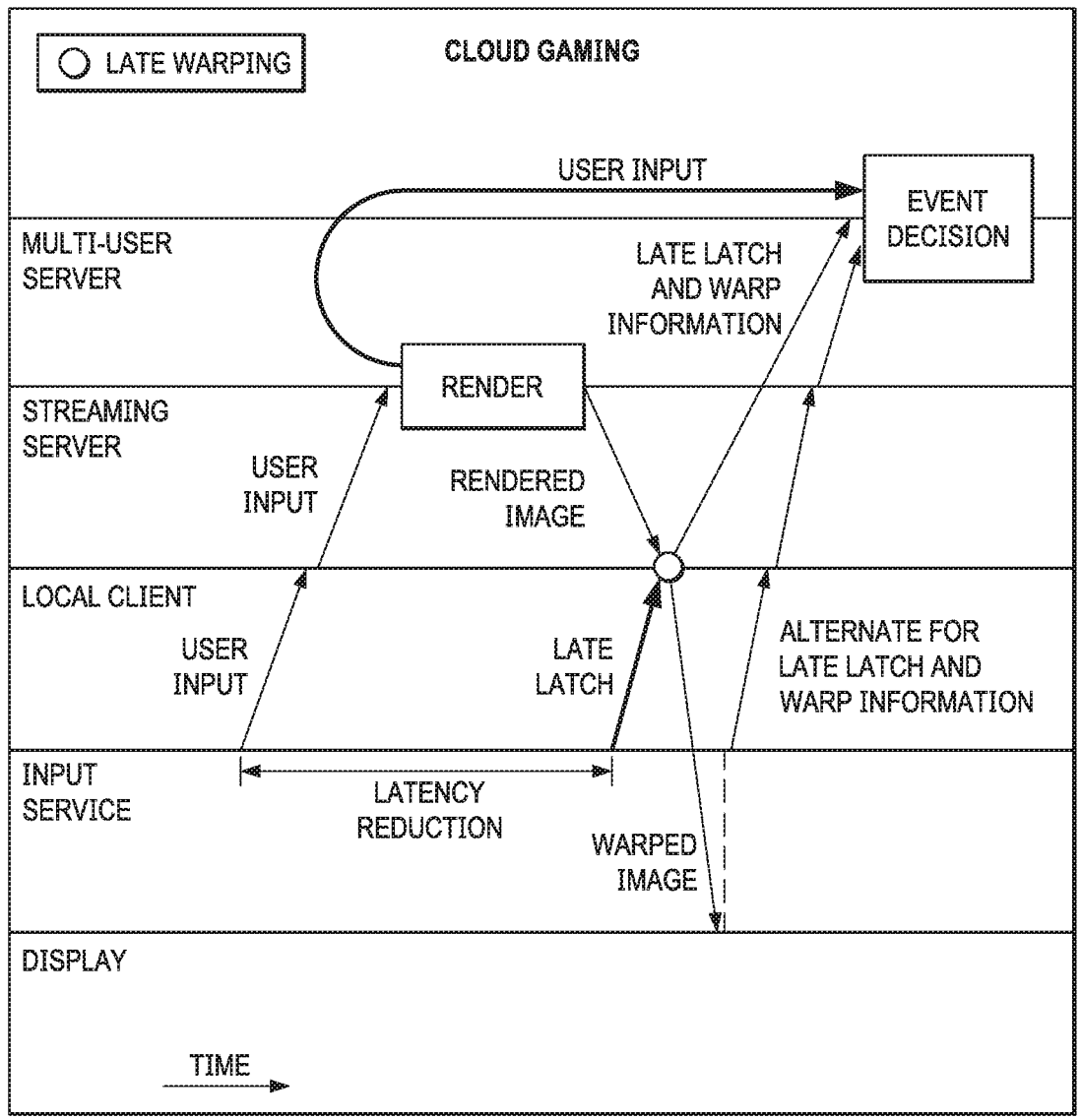
FIG. 5 illustrates a cloud gaming configuration of an imaging system for performing late warping according to the principles of the disclosure.

The event decision feature provided herein can be provided as an option for application designers to implement in interactive computer products. An application engine can be configured to receive a late latch input and scene information from late warping and make an event decision based thereon. The application engine can be a game engine and the event decision can be a game event decision for a video game. A multi-user server can cooperate with an application engine and include logic for making event decisions for one or more users. FIG. 4 and FIG. 5 illustrate examples of a multi-user server in a local gaming and a cloud gaming configuration.

As noted above, the late warp methods as disclosed herein can be employed on imaging hardware and used as hardware acceleration on different devices that communicate with a renderer. Renderers can be implemented on serial processors, such as central processing units (CPUs) and parallel processors, such as graphics processing units (GPUs). The imaging hardware can be integrated with a computer connected to a separate display or can be integrated with a display itself. For example, some of the operations involved for late warping can be mapped to 2D operations which may be performed on the fly during scanout to a screen of a display. Using the 2D operations reduces the amount of late warp needed to be performed by a rendering engine and further reduces latency. Imaging hardware can be used to implement the late warping and can be associated with hardware for compositing. Compositing is combining two or more images to make a single image, such as a screen image for displaying on a screen. While a GSYNC display is an example of a thin client that can be used for cloud gaming, GSYNC is also an example of how a display could add late warp to local non-cloud gaming. Another example of a thin client that can be used is software in a TV dongle, such as SHIELD TV from Nvidia Corporation of Santa Clara, California. GSYNC is an adaptive synch technology that is also available from Nvidia Corporation.

Figure 1:
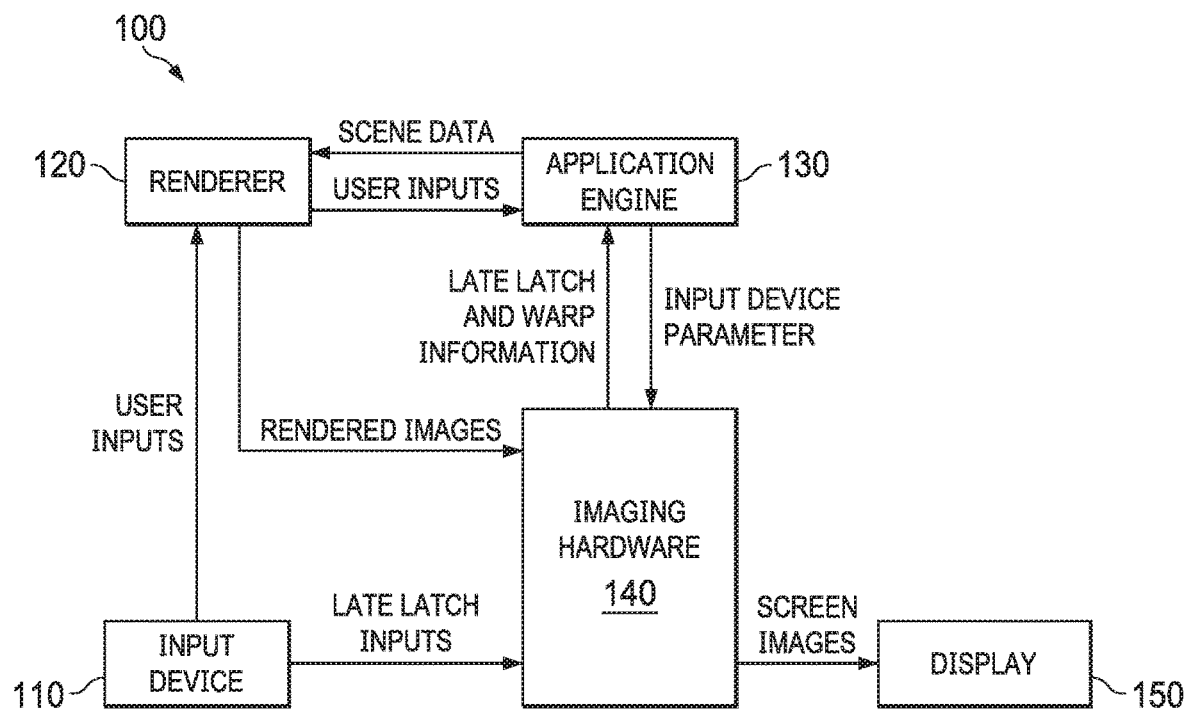
FIG. 1 illustrates a block diagram of an imaging system constructed according to the principles of the disclosure.

Turning now to the figures, FIG. 1 illustrates a block diagram of an imaging system 100 constructed according to the principles of the disclosure. The imaging system 100 provides an example of hardware acceleration for late latching and warping with an interactive computer product and illustrates a system that uses dedicated hardware for late warping. In one example, all of the late-warp operations can be performed in specialized hardware and remove any interference with scene rendering being done using conventional rendering resources. The operations involved in doing late warp can be mapped to 2D operations and moved from a rendering engine to a display scan out path to further optimize latency. This not only reduces the shader pass of a rendering pipeline but also potentially allows a user's interaction with a screen image to be sampled at a much later time. The imaging system 100 includes a user input device 110, a rendering engine or renderer 120, an application engine 130, imaging hardware 140, and a display 150.

The user input device 110 captures a user's interaction with a screen image displayed on a screen of the display 150. The user input device 110 provides the user's interactions as user inputs to the renderer 120 to be employed for rendering a subsequent scene image. The user inputs are also provided to the application engine 130 to employ for making event decisions. The user inputs can be provided to the application engine 130 via the renderer 120. The input device 110 also provides late latch inputs to the imaging hardware 140 for late warping.

The renderer 120 generates rendered images for scene images based on the user inputs and scene data from the application engine 130. The application engine 130 generates scene data in response to the user inputs and provides the scene data to the renderer 120 for rendering. The application engine 130 can also make event decisions, either individually or in cooperation with the renderer 120. The renderer 120 and the application engine 130 can be conventional engines used to render images for viewing. The renderer 120 can be located proximate the user input device 110, such as in a computer operating as a local client, or can be located remotely from the user input device 110, such as in a data center. The application engine 130, for example, can be located remotely from the user input device 110 in a cloud server. One or more of the user input device 110, the renderer 120 and the application engine 130 can be coupled together via conventional communication networks, such as the internet, for communicating data in between. The renderer 120 sends the rendered images to the imaging hardware 140.

The imaging hardware 140 is configured, i.e., designed and constructed, to perform late warping on the rendered images from the renderer 120 based on the late latch inputs from the user input device 110. Based on the late warping, the imaging hardware 140 provides screen images to the display 150 for viewing. The late latch inputs are provided from the user input device 110 to the imaging hardware 140 at a later time than the user inputs previously provided to the renderer 120 for rendering. The user input device 110 can provide the late latch inputs to the imaging hardware 140 via, for example, conventional connections.

In addition to the late latch input, the imaging hardware 140 can also employ input device parameters for performing the late warping. An input device parameter can be used to modify the late latch input to determine a rotation or translation for a particular interactive computer product, such as for a camera view. The input device parameter or parameters can be provided by the application engine 130 to the imaging hardware 140. For example, the input device 110 can be a mouse and the input device parameter can be a mouse gain that multiplies the late latch input to either increase or decrease the magnitude of the value of the late latch input to provide the rotation or translation for the particular interactive computer product executing on the application engine 130. The input device parameter can be received by the imaging hardware 140 from the application engine 130 via an auxiliary channel that is usually used for communicating audio. A display connector, such as a High-Definition Multimedia Interface (HDMI) connector, can be used for inputting the input device parameter to the imaging hardware 140. The communication of data between the application engine 130 and imaging hardware 140 can employ conventional connections and communications networks and can vary depending on the configuration of the imaging system 100 and the proximity of the application engine 130 to the imaging hardware 140.

The imaging hardware 140 can also send the late latch inputs and scene information from the late warping results to the application engine 130. The imaging hardware 140 can send the late latch inputs and the scene information to the application engine 130 via the renderer 120. The application engine 130 can then update the application data, such as state information, based on the late latch inputs and the late warping results. The application engine 130 can also employ the late latch input and scene information from late warping, collectively referred to as late latch and warp information, for event decisions. The late latch and warp information allows the application engine 130 to provide view consistent event decisions by evaluating event decisions based on the simulation the user is seeing on the display 150. As noted in FIGS. 4 and 5, a multi-user server associated with an application engine can include the logic for making event decisions instead on the application engine; as such, the event decisions can be made by different computing devices according to where that portion of the software logic for the application resides. In some examples, the imaging hardware 140 can evaluate events and send the results of the evaluation to either the application engine 130 or a multi-user server connected thereto for validation in order to make event decisions. Instead of the imaging hardware 140, another circuit or processor can access a memory associated with the imaging hardware 140 to evaluate the event decisions before sending for validation. A local client device can be used to forward the information for validation.

An example of an event decision is determining whether a bullet hit a target. Event decisions can include other binary-type of events or actions that either affect or do not affect an application created world, such as a game world. In addition to yes or no type of event decisions, other complex types of actions can also cause an event decision. For example, a physical interaction where a block is hit that causes movement based on the interaction can result in an event decision. Thus, event decisions can also include a continuous displacement based on a physics simulation. Additional examples of actions or events causing event decisions include various abilities to dodge a bullet or an attack, improve the performance of a teammate, open or close a door, or affect the game world in other ways. The late latch and warp information for event decisions can be, for example, one or more of an ID map of objects in an application (image of Object IDs) such as game objects, view position and orientation of a virtual camera used for late warping, and a late latch input.

Figure 2:
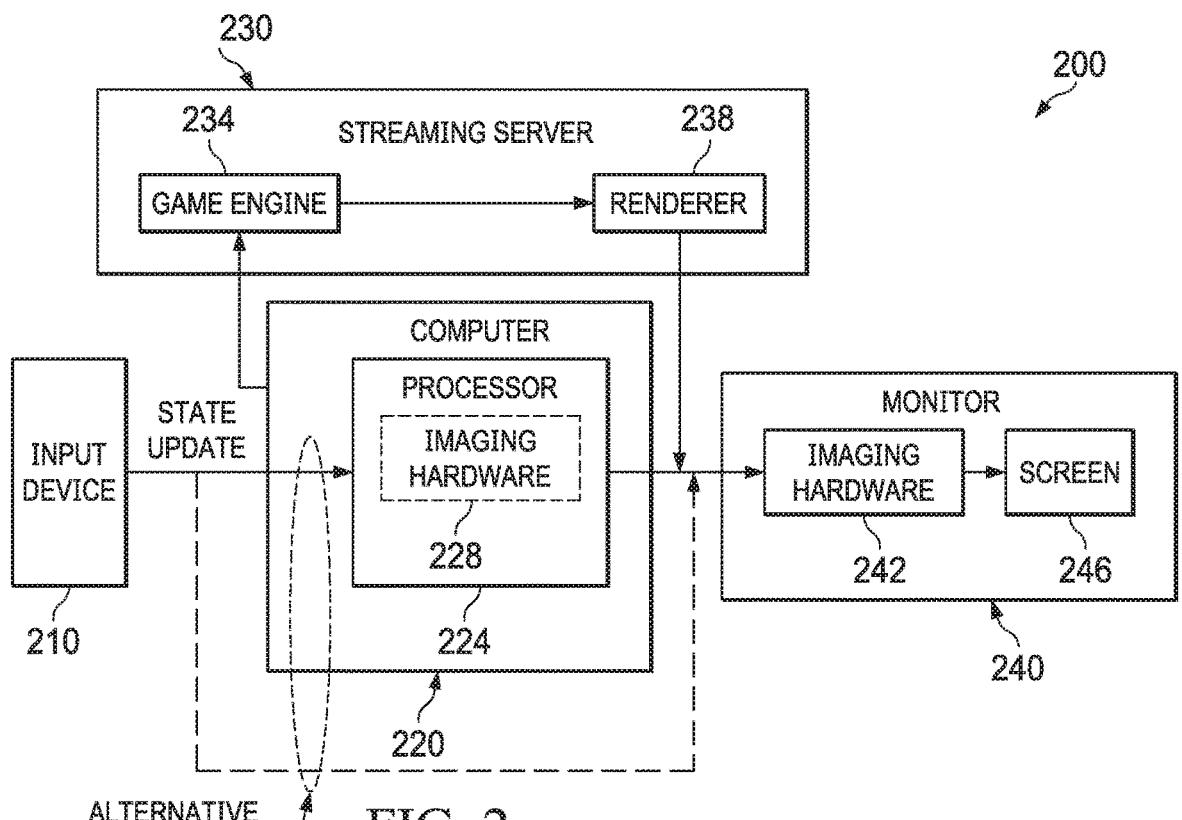
FIG. 2 illustrates a block diagram of an example of an imaging system that provides hardware acceleration for late latching and warping according to the principles of the disclosure.

The imaging hardware 140 can be located in different devices. For example, the imaging hardware 140 can be located in a computer connected to the user input device 110. As such, the imaging hardware 140 may be embedded in the display architecture inside a GPU. Additionally, the imaging hardware 140 can be located in the display 150 and the imaging hardware 140 can handle both compositing, such as Heads Up Display (HUD), of rendered images and late warping. The imaging hardware 140 can be part of a synch panel, such as a GSYNC panel, of the display 150, and the late latch inputs can be sent to buffers coupled to the synch panel. FIG. 2 illustrates different alternatives for implementation of the imaging hardware 140.

The display 150 provides a visual representation of the screen images on a screen of the display 150. Accordingly, the display 150 includes the necessary hardware and software to display screen images, such as with a conventional display. Depending on the implementation, the display 150 can receive the screen images from the imaging hardware 140 located in another device or can receive the screen images from the imaging hardware 140 integrated with the display 150. The display 150, therefore, can include conventional components and the imaging hardware 140. As noted herein, the display 150 can be a single independent device or integrated with another device, such as the local client computer.

FIG. 2 illustrates a block diagram of an example of an imaging system 200 that provides hardware acceleration for late latching and warping according to the principles of the disclosure. The imaging system 200 is in a cloud gaming context and illustrates a pipeline that uses dedicated hardware for late warping. The rendering pipeline provides an example where all the late-warp operations can be performed in specialized hardware and remove any interference with game scene rendering being done using conventional rendering resources. The imaging system 200 includes an input device 210, a computer 220, a game engine 234, a renderer 238, and a monitor 240. The game engine 234 and the renderer 238 are both located in a cloud architecture represented by streaming server 230. The streaming server 230, for example, can be, or can include components of, the streaming server 902 of FIG. 9. Each of these components of the imaging system 200 can be connected via conventional connectors or communications networks.

The input device 210 captures a user's interaction with a screen image displayed on screen 246 of the monitor 240. The user input device 110 provides the user's interactions as user inputs to the computer 220 that are then provided to the game engine 234. The user inputs provide a state update for the game engine 234 to employ for making event decisions and to the renderer 236 for rendering a subsequent scene image that is sent to the computer 220 for viewing on the screen 246.

The computer 220 is a local client computing device and can be a desktop, laptop, or other computing device having interfaces for connecting to the input device 210, the game engine 234 and the renderer 238 of the streaming server 230, and the monitor 240. The streaming server 230 can be a configuration of servers communicatively coupled together. The game engine 234 and the renderer 238 can be implemented on different servers or on a single server, such as the streaming server 230. The monitor 240 is a separate device coupled to the computer 220 that is configured for displaying video.

In addition to the user inputs that are provided to the streaming server 230 for cloud-based rendering, the input device 210 also provides late latch inputs to imaging hardware for late warping. In one example the imaging hardware is located in the monitor 240, such as represented by imaging hardware 242. As such, the late latch inputs can be sent from the input device 210 to the imaging hardware 242 via the computer 220. Alternatively, the input device 210 can send the late latch inputs to the imaging hardware 242 via a direct connection. The imaging hardware can also be located within the computer 220, such as represented by imaging hardware 228. The imaging hardware 228 can be part of a processor 224 of the computer 220 as illustrated or can be located external to the processor 224. The processor 224 can be a GPU or a CPU. The imaging hardware 228 can be embedded in a display architecture inside a GPU.

The operations involved in doing late warping can be moved from the renderer 238 to either the imaging hardware 228 or the imaging hardware 242 depending on the implementation of the imaging system 200. For the imaging hardware 242, late warping can be mapped to 2D operations and moved to a display scan out path of the monitor 240 to further optimize latency. Moving the late warping to the display scan out path reduces the shader pass performed by the renderer 238 and can also allow sampling of user inputs at a much later time. The imaging hardware 228 or 242, as such, is configured to perform at least some of the features disclosed herein for late warping, such as the imaging hardware 140. The imaging hardware 228 or 242 can handle both compositing (HUD and game) and late warping.

Figure 3:
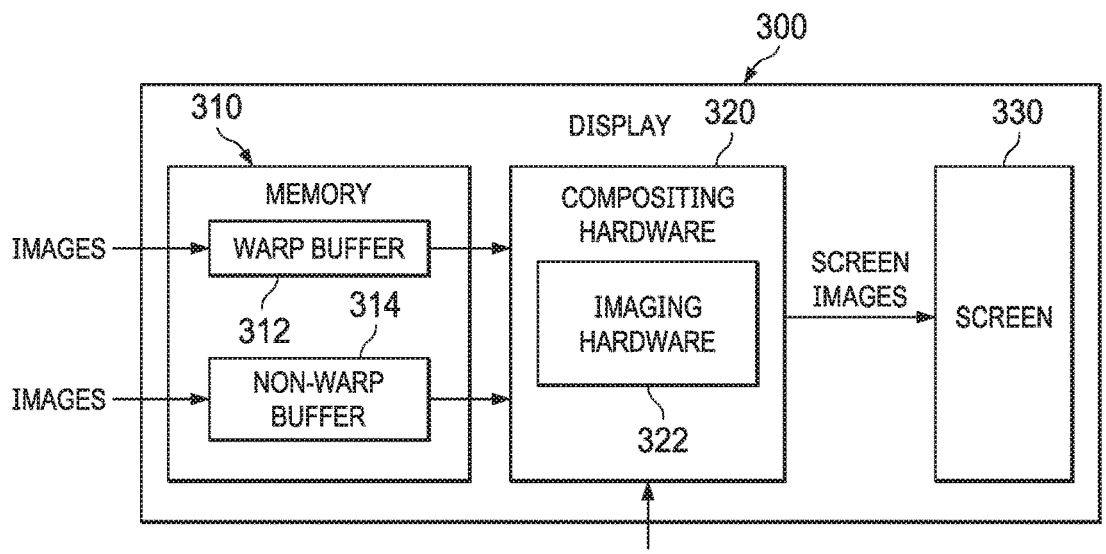
FIG. 3 illustrates an example of a display having imaging hardware for performing late warping according to the principles of the disclosure.

The image hardware 228, 242, of FIG. 2 are examples of a last-stage client renderer that performs image-based rendering. For image-based rendering, the cloud game engine 234 and renderer 238 can be used to render player view (3D) and HUD (2D) and send them independently to be merged on the computer 220. In some examples, the imaging hardware 228, 242, perform rotation only image-based late warping that is then combined with the previous translation position. Image only late warping can also be done with translation compensation. Variations for the image-based late warping include:
  a. Rotation-only from single image to single image
  b. Rotation-only from image w/guard bands to single image
  c. Rotation-only from partial cube map to single image
  d. Rotation-only from cube map to single image
  e. Rotation-only from octahedron map to single image
  f. a-e but adding depth buffer to input
  g. a-e also adding normal
  h. a-e but extracting or estimating depth from rendered image FIG. 3 illustrates an example of a display 300 having imaging hardware for performing late warping according to the principles of the disclosure. The display 300 can be an independent viewing device, such as a monitor, that is coupled to a separate computing device, or can be integrated with a computing device, such as with a laptop. The display 300 includes a memory 310, compositing hardware 320, and a screen 330. Each of these components of the display 300 can be coupled together via conventional connections typically used in a display. The display 300 can include additional circuitry, components, etc. typically included with a display.

The memory 310 is configured to store data, i.e., provide data storage, that can be used for operating the display 300. The memory 310 includes buffers for storing rendered images that are used to provide screen images for the screen 330. Separate buffers, warp buffer 312 and non-warp buffer 314, are used to store the rendered images that are to be late warped and the rendered images that are not to be warped. The warp buffer 312 and the non-warp buffer 314 can be part of a graphical memory of the memory 310. The warp buffer 312 and the non-warp buffer 314 each represent one or more buffers that can be used for storing images for warping or non-warping. The memory 310 can also include other types of buffers for processing images to be displayed. The rendered images received by the warp buffer 312 and the non-warp buffer 314 can be received from a renderer via a computing device, such as the computer 220 in FIG. 2. The rendered images for the warp buffer 312 can be images that correspond to a view of a scene. The rendered images for the non-warp buffer 314 can be composited elements, such as, a HUD. The separate buffers can be for 2D content (non-warp buffer 314) and 3D content (warp buffer 312).

The compositing hardware 320 is configured to composite images to create screen images for display on the screen 330. In addition to typical circuitry used for compositing images, the compositing hardware 320 also includes imaging hardware 322 that is configured to perform late warping to images based on late latch inputs. The imaging hardware 322 can receive a rendered image from the warp buffer 312 and warp at least a portion thereof based on a late latch input to provide a late warped image. The compositing hardware 320 can then composite the late warped image with a rendered image from the non-warp buffer 314 to create a screen image for the screen 330. The compositing hardware 320 and the imaging hardware 322 can process a stream of rendered images to provide a video stream of screen images for the screen 330. The compositing hardware 320 and the imaging hardware 322 can be part of the scan out path of the display 300. In addition to the imaging hardware 322, the display 300 can include additional components that cooperate with the imaging hardware 322 to provide image-based rendering.

With separate buffers, images from the warp buffer (or buffers) 312 can be warped by the imaging hardware 322, and then combined with the composited elements of the non-warp buffer 314 that do not require warping. The imaging hardware 322 can combine a warped portion of an image with the non-translated part as previously rendered to create a warped image. Using HUD as an example of composited elements, the compositing hardware 320 can receive images from the warp and non-warp buffers 312, 314, at different rates; this allows screen images to be updated more (or less) times per second than the HUD and decouples the display and render rate for the HUD (typically the images less frequently received of the two buffers 312, 314). Since typically the HUD changes are relatively infrequent and do not involve elaborate projections, the HUD images could be updated at or approximately at 10 Hz while the images from the warp buffer 312 are warped/drawn at or approximately a higher rate, such as at 120 Hz, 240 Hz, or 360 Hz.

By reducing or removing the high contrast/frequency edges produced by at least some of the composited elements, lower complexity image compression schemes can be applied; this can improve compression ratios for both of the images from the warp and non-warp buffers 312, 314. Additionally, composited elements of the non-warp buffer 314 could be further split into multiple element buffers and/or blitting of some content, such as HUD, can be completely done locally at the display 300 without a need for input from the external renderer. To "blit" is to copy bits from one part of the memory 310, such a graphical portion, to another part that deals directly with the pixels of an image, and draws them directly to the screen 330. With multiple buffers for composited elements, high rate HUD elements, such as a map or compass, can be updated at higher rates, while low rate elements, like a reloading weapon ammunition indicator, can be sent infrequently and/or asynchronously. In one example, frequently changing HUD content can be "rendered" completely locally, by blitting the required text/images to a location on the scene from a pre-rendered texture atlas provided once at the start of a session, such as a game session of a video game.

Some complex HUD textures that contain perspective-rendered 3D geometry have become common in video games, such as illustrated in FIG. 6, which can present an issue for simple, blitted textures where these dynamics will either require large texture lookups/memory footprint or limited quality. Examples of this sort of dynamic 3D-style content in modern games can include weapons, compasses, and minimaps, i.e., 3D content as HUD.

In one example, the disclosure provides a solution by allowing developers to upload not just source textures, but also limited dynamic shaders to a client device, such as computer 220, at the start of a game session. These shaders could support additional dynamics for various in-game content (i.e., weapon firing, bounce, compass warp).

In one example, the disclosure also provides a solution for late warping of projectile animation when cloud-based rendering is employed by moving "rendering" of projectiles to the client device, allowing perspective correct, and possibly time-extrapolated projectiles to be displayed accurately in a game. In this approach the cloud game server renders all frames without projectiles present and the local clients composite their own projectiles as needed. By using the updated view direction/projectile motion parameters to compute the "latest" location of the projectile, if on the screen, an "up to date" projectile location can always be used to blit a projectile image into the frame buffer, thus avoiding issues with occlusion in warping. This can be advantageous for projectiles without large models/complex dynamics. The shader-driven approach described above could also be employed.

In another example that avoids local rendering of large projectiles, projectiles with clearly oriented models, such as a rocket, can be locally stored as a series of textures representing this model from reasonably well sampled orientations. The local client can then compute the projectile's orientation/heading and lookup an appropriate texture to blit to its current location. The memory 310 can be used to store the textures or other data needed for the late warping variations.

FIGS. 4 and 5 illustrate an example of the flow of signals of a user playing a video game reacting to screen images displayed on a screen of a display. FIGS. 4 and 5 provide a simple diagram of an example of one user and one input device being used for late latching and late warping. Additional signals lines would be included for other input devices. The arrows in FIGS. 4 and 5 represent at least some of the flow of signals between the components of the gaming configurations in FIGS. 4 and 5 for playing a video game. FIGS. 1-3 provide examples of different configurations in which the flow of signals illustrated in FIGS. 4 and 5 can be employed.

FIG. 4 represents a local gaming configuration and FIG. 5 represents a cloud gaming configuration. The functionality of the systems represented in FIGS. 4 and 5, however, are not necessarily restricted to certain devices in either the local or cloud gaming configurations of FIGS. 4 and 5, but can be distributed across multiple devices in either example representation, i.e., functionally distributed. A game designer can determine the distribution of the functionality across the different devices of either configuration to maximize a user's experience. In FIG. 4, rendering is performed at a local client computing device and in FIG. 5 rendering is performed remotely from a local client at a streaming server, such as the streaming server 902 of FIG. 9. In contrast to FIG. 5, the local client and the streaming server can be considered the same entity in the local gaming configuration of FIG. 4 and latency between them can be advantageously ignored. The streaming server can be located in a data center.

For both FIGS. 4 and 5, a display, an input device, the local client, and a multi-user server are represented. The multi-user server can be located remotely from the local client, such as at a server located in the cloud, and can be configured to coordinate the play of multiple users in a local gaming configuration, a cloud gaming configuration, or a combination of users in both configurations. In both FIGS. 4 and 5, late warping is represented by a circle and is performed at the local client by imaging hardware such as disclosed herein. As noted in FIG. 3, late warping can also be performed by imaging hardware located in the display. FIGS. 4 and 5 illustrate an example of a game event decision model, i.e., the authoritative server model, but the game event decision feature disclosed herein can be applied to any game event decision model in general.

In FIG. 4, a user input is provided from an input device to the local client for rendering an image. In FIG. 5, the local client sends the user input to the streaming server for rendering an image that is then sent to the local client. The user input is also provided to the multi-user server as an input for view consistent event decisions. A late latch input is also provided from the input device to the local client for late warping of the rendered image. The warped image is then provided to the display for viewing.

The late latch input can be, for example, the aiming direction of a gun that is being shot in a video game. Even if the gun is not being shot, immediate feedback of where the gun is being aimed helps achieve more accurate aiming, i.e., reduce input to presentation latency. Polling of inputs can be done by the local client to obtain a late latch input before sending the rendered image to the display. To obtain late latch inputs, some inputs can be designated for late latching. For example, in shooter games all mouse or gun movements can be designated for late latching. Other types of game input devices can also be captured for late latching, such as keyboard, game controller, touch screen inputs, motion controls, webcam based interactions, etc. A single input or a combination of the multiple types of inputs can be captured for late latching.

The late latch input can also be sent to the multi-user server for event decisions. Additionally, scene information due to late warping can be sent to the multi-user server. Using the late latch input and the late warping scene information allows the multi-user server to evaluate a game event, such as a hit or miss from a gunshot, based on what the user, e.g., gamer, is seeing. FIGS. 4 and 5 provide examples of providing the late latch input and scene information from late warping, the late latch and warp information, to the multi-user server at different times and from different devices.

The late latch and warp information for event decisions can be sent to the multi-user server in multiple ways. Inputs can be provided with timestamps from the local client. Additional information can also be added to the user input at, for example, a late time input. In another example, a single packet can be sent from the local client with an additional column of timestamps corresponding to when the packet was forwarded by the user and when the screen was rendered. Accordingly, for view consistent event decisions, the multi-user server may receive more than one input state. While FIGS. 4 and 5 illustrate different input times that can be used, other examples may also be used for view consistent event decisions. The dashed lines in FIGS. 4 and 5 provide an example of sending at least some of the late latch and warp information to the multi-user server when late warping is performed in the display.

As represented by FIGS. 4 and 5, the latency solutions provided herein can be applied to both local and cloud gaming configurations. User input is sampled for the rendering pipeline in local gaming and for streaming in cloud gaming. Additional user input can be sampled asynchronously at the time it is needed for the late warp operation. This short circuits the normal rendering pipeline for cloud gaming too, as the input device and display are local and form a "thin client".

FIGS. 4 and 5 provide visual representations of the various features of the latency solutions disclosed herein. The features include:

1. Late-latching input while doing the main rendering workload. Here, the renderer (e.g., GPU) can use the latest user input sampled at the last moment before needed, rather than have a CPU push the values when issuing rendering commands.

2. Late-warping the image rendered in the cloud to better match more recent inputs. After the image has been rendered, the image can be updated based on a more recent user input. For example to apply a more recent view the image can be "re-projected". Further updates such as local prediction and rendering of firing effects, spawning projectiles and other immediate visual feedback can also be made.

3. Late-latching user input while late-warping. Similar to point 1 above, the renderer can access the latest input.

4. Delaying the late-warping until just before scanout, such as vsync, to minimize late-latched input to scanout latency. In addition to reducing latency, this reduces the number of buffers needed, bandwidth and power consumption.

5. Correcting for discrepancy between the late-warped frame and game state. This is advantageous as late-warp shows the user different content than the game intended. For example if the user fires a weapon after seeing a late-warped frame, the user would expect the aim to match the new view but the old game state at the time of rendering.

FIG. 6 provides an example of a screen image of a video game that has 3D content and 2D content. As a user rotates, i.e., changes orientation, in a scene the screen image will change. The disclosure recognizes that when employing late warping, avoiding warping of composited elements like the player HUD, weapon, and any projectiles, is advantageous. Shaded elements in FIG. 6 provide an example of composited elements that may not be late warped. Additional 2D elements are also illustrated in FIG. 6 that do not need to be warped. One approach to address this is employing split buffers, in which one buffer is for the view to be warped and the other buffer is for the elements to be composited, such as the warp and non-warp buffers 312, 314, of FIG. 3. Multiple buffers for late warping can be used. For example, multiple buffers can be used in the 3D world for an environment map for rendering images in front of and behind the user, and to the left, the right, above and below the user. Then no matter how far a user rotates, an image can be displayed. The various buffers can be part of a memory that is included in dedicated hardware for late warping, such as the imaging hardware disclosed herein, or coupled thereto.

FIG. 7 illustrates a flow diagram of an example method 700 of rendering a screen image employing late warping carried out according to the principles of the disclosure. The method 700 employs imaging hardware for the late warping based on at least one late latch input. The imaging hardware can be located proximate a display. For example, the imaging hardware can be located in the display, such as the imaging hardware 242 and 322 of FIG. 2 and FIG. 3, or in a local client computing device, such as the imaging hardware 228 of FIG. 2. The method 700 begins in step 705.

In step 710, the imaging hardware receives a rendered image. The rendered image is based on a user input from an input device and scene data from an application engine. One or more rendered images can be received. The rendered image or images can be stored in one or more buffers. With multiple rendered images, at least one can be designated for possible late warping and one or more can be designated for non-warping. The rendered image can be generated by a cloud-based renderer or a renderer located in the local client computing device. The received rendered image can be encoded for transmission.

A late latch input is received at the imaging hardware from the input device in step 720. The late latch input can be received directly from the input device or via another device, such as the local client computing device. The late latch input may be received in response to a polling action. More than one different type of late latch input can be received.

In step 730, a warped image is rendered by the imaging hardware by warping at least a portion of the rendered image based on the late latch input. The warping, i.e., late warping, can be rotational, translational, or a combination of both. The warping can be performed by changing image look-up indexing for the portion. The portion for late warping can be defined by a geometric shape associated with a center of the rendered image. The shape can be centered with the center of the rendered image or the center of the shape can be offset from the center of the rendered image. The shape can be a circle, an ellipse, a square, a rectangle, a triangle, etc. The portion can also be an object or based on an object of a rendered image. Additionally, the complete rendered image can be warped to create the warped image.

The portion for late warping can be selected to prevent re-rendering the edges of the rendered image. Accordingly, the portion can be defined such that content of the rendered image can be maintained at the four edges. The portion can also be defined to exclude 2D content of the rendered image. The portion can be determined based on an interactive computer product executing on the application engine. For example, determining the portion for late warping can be made by a game designer of a game executing on a game engine. The portion for late warping can exclude the location of 2D content on the rendered image. The shaded areas of FIG. 6 provide an example of such 2D content.

The frame rate of the display in which the warped image will be displayed can also be a factor employed to define the portion. With a high frame rate, imperfections associated with late warping would persist for a short duration of time on the display to limit or even prevent a negative viewing experience for a user. For example, at 240 Hertz imperfections from late warping would be displayed for approximately four milliseconds making it difficult for a user to even detect. Accordingly, the portion for late warping can be larger with a higher frame rate since a compromise in image quality could be hard for a user to detect.

Even with a high frame rate, for image quality the rendering can also include resolving discontinuities between the portion that is warped and remaining portion of the rendered image that is not warped. The discontinuities can be resolved by doing an interpolation. For example, a linear interpolation from the center of the portion to the periphery of the rendered image to smooth the transition between the late-warped portion and non-warped portion of the rendered image can be used. The linear interpolation can be between an index of the portion and an index of the remaining portion. Various levels of complexity can be used for blending the late-warped portion and non-warped portion based on such factors as available processing power and frame rate. Blending to the edge of a scene can be performed by using a guard band image. Besides linear interpolation, other types of interpolation or smoothing functions can be used and may result in a higher quality.

In step 740, a screen image for the display is generated by compositing the warped image with a non-warped image. The compositing can be performed by compositing hardware located in the display. The imaging hardware can be integrated with the compositing hardware. The non-warped image or images can be from a dedicated non-warp buffer and the warped image is from the imaging hardware.

The screen image is then provided to a screen for display in step 750. The screen can be part of a monitor connected to a local client computing device. Multiple screen images can be generated according to the method 700 to generate a video stream of screen images for display on the screen. The video stream can be part of an interactive computer product, such as a video game. The method 700 ends in step 760.

The method 700 is an example of a method carried out according to the principles of the disclosure that can be used for displaying scenes of a video game to improve a user's experience while playing. A new scene of a video game can be created, for display on a screen, using a computer and a first input from a user that is playing the video game. A second input from the user can then be received during the creating of the new scene. The first input and the second input correspond to interactions of the user with objects of a current scene of the video game displayed on the screen, i.e., what the user is seeing, wherein the second input is received after the first input.

The new scene can be adjusted using the second input from the user and a circuit located proximate the screen. Thus, the process of creating the new scene can begin with the first input and by updated using the second input. The adjusted scene can be displayed on the screen and information about the video game can be updated using the second input and the adjusted scene.

The screen can be part of a display with the circuit located in the display. Additionally, the first and second inputs can be from a single input device used by the user to interact with the video game, and the circuit can receive the second input directly from the input device. In examples, adjusting of the new scene can be for rotation associated with the user while playing the video game. The adjusting can be for all of the new scene or only part of the new scene. The adjusting can include blending between part of the new scene that is adjusted and part of the new scene that is not adjusted.

FIG. 8 illustrates a block diagram of an example of a computing device 800 suitable for use in implementing at least a portion of some examples disclosed herein. Computing device 800 may include an interconnect system 802 that directly or indirectly couples the following devices: memory 804, one or more CPUs 806, one or more GPUs 808, a communication interface 810, input/output (I/O) ports 812, input/output components 814, a power supply 816, one or more display 818, and one or more logic units 820.

Although the various blocks of FIG. 8 are shown as connected via the interconnect system 802 with lines, this is not intended to be limiting and is for clarity only. For example, in some embodiments, display 818, or another a presentation component, may be considered an I/O component 814 (e.g., if the display 818 is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device 800 of FIG. 8 is merely illustrative. Distinction is not made between such categories as workstation, server, laptop, desktop, tablet, client device, mobile device, hand-held device, game console, electronic control unit (ECU), virtual reality system, and/or other device or system types, as all are contemplated within the scope of the computing device 800 of FIG. 8. The computing device 800, or at least portions thereof, can correspond to one or more of the computing devices associated with respect to FIGS. 1 to 7.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. There can be direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a computer program(s) and/or a program element(s)), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. One or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the display 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof.

The power supply 816 may provide power to the computing device 800 to enable the components of the computing device 800 to operate.

The display 818 can be a monitor, a touch screen, a television screen, a HUD, other display types, or a combination thereof, and include audio presentation components such as speakers. The display 818 may receive data from other components (e.g., the GPU(s) 808, the CPU(s) 806, etc.), and output the data (e.g., as an image, video, sound, etc.). The display 818 can be, or can include at least some of the components of, the display 300 of FIG. 3.

FIG. 9 illustrates a system diagram of an example of a streaming system 900, in which at least a portion of some examples disclosed herein can be implemented. FIG. 9 includes streaming server(s) 902 (which may include similar components, features, and/or functionality to the example computing device 800 of FIG. 8), client device(s) 904 (which may include similar components, features, and/or functionality to the example computing device 800 of FIG. 8), and network(s) 906 (which may be similar to the network(s) described herein). The streaming system 900 can be a game streaming system and the streaming server(s) 902 can be a game streaming server(s).

In the system 900, for an application session, such as a game session, the client device(s) 904 may only, for example, receive input data in response to inputs to input device(s), transmit the input data to the streaming server(s) 902, receive rendered images as encoded data from the streaming server(s) 902, and display the encoded data as screen images on the display 924. As such, the more computationally intense computing and processing is off-loaded to the streaming server(s) 902 (e.g., rendering—in particular ray or path tracing—for graphical output of the session is executed by GPU(s) of the streaming server(s) 902). In other words, the session is streamed to the client device(s) 904 from the streaming server(s) 902, thereby reducing the requirements of the client device(s) 904 for graphics processing and rendering. With the computationally intense computing and processing offloaded, as disclosed herein the client device 904 can include imaging hardware and perform late warping on the rendered images employing late latch inputs from one or more of the input device(s). For example, client device 904 can include imaging hardware such as imaging hardware 228 of FIG. 2, and/or display 924 of the client device 904 can include imaging hardware, such as imaging hardware 242 of FIG. 2. For illustration, the display 924 includes imaging hardware 925.

With respect to an instantiation of a game session as an example, a client device 904 may be displaying a frame of the game session on the display 924 based on receiving rendered images from the streaming server(s) 902. The client device 904 may receive a user input to one of the input device(s) 926 and generate user input data (i.e., user input) in response. The client device 904 may transmit the user input to the streaming server(s) 902 via the communication interface 920 and over the network(s) 906 (e.g., the Internet), and the streaming server(s) 902 may receive the user input via the communication interface 918. CPU(s) 908 may receive the user input, process the user input, and transmit the processed user input to GPU(s) 910 that cause the GPU(s) 910 to generate a rendering of the game session. For example, the user input may be representative of a movement of a character of the user in a game, firing a weapon, reloading, passing a ball, turning a vehicle, etc. The CPU(s) 908 and the GPU(s) 910 can cooperate to perform functions of an application engine as disclosed herein, such as the application engine 130 and/or the game engine 234. The rendering component 912 may render the game session (e.g., representative of the result of the user input) and the render capture component 914 may capture the rendering of the game session as rendered images (e.g., data that can be displayed that captures the rendered frame of the game session). The rendering of the game session may include ray or path-traced lighting and/or shadow effects, computed using one or more parallel processing units—such as GPUs 910, which may further employ the use of one or more dedicated hardware accelerators or processing cores to perform ray or path-tracing techniques—of the streaming server (s) 902. The encoder 916 may then encode the rendered images to generate encoded data (encoded rendered images) that can be transmitted to the client device 904 over the network(s) 906 via the communication interface 918. The client device 904 can receive the encoded rendered images via the communication interface 920 and the decoder 922 may decode the encoded rendered images for display on a screen of the display 924. The imaging hardware 925 can receive a late latch input from input device(s) 926 and perform late warping on the rendered images to generate screen images that the client device 904 may then display via the display 924. A portion or all of a rendered image can be late warped by the imaging hardware. As illustrated in FIG. 3, the imaging hardware 925 can be integrated with compositing hardware of the display 924.

As discussed above, the disclosure addresses the problem of high, end-to-end latency experienced in interactive computer products, such as video games. Such latency problems include delay in the 3D view (i.e., position and rotation that the image is rendered at), delay in game state changed by user input such as displaying weapons firing and spawning projectiles, and interaction issues related to the solutions to these problems, such as a mismatch of view dependent input events between the displayed image and the game simulation time in which it was rendered. The disclosure considers the entire gaming experience and provides methods of applying late warp in hardware and game event evaluation in the presence of late latch and late warp. Thus, unlike some methods that may simply employ late warping, the disclosure considers the entire pipeline.

The features disclosed herein for reducing latency can be applied in different instances of single players and multiple players. For single players, cloud gaming presents an interesting use-case for online gaming, in that users may choose to play single-player, or non-competitive/cooperative games from their local client. In this case the quality of the experience that could potentially be delivered by the server avoids the traditional "fairness" pitfalls of netcode determinations between players with variable Round Trip Time (RTT) to the server. Here features, such as image-space thin-client hit detection, object animation/compositing, and/or more complex warp techniques can be applied to improve the experience.

In the multi-player context, the RTT issues well understood by most netcode developers are a challenge. Multiplayer gaming in the cloud is somewhat different than the typical conditions for which most multiplayer games are built. The cloud gaming server (playing the role of the traditional "client") can often be very "close" to the game server, minimizing the (spread of) RTT most important to most online gaming experiences. However, when the RTT between the cloud gaming server and (true) client is large, an added, uncontrolled latency is introduced for which the cloud unaware netcode cannot adjust. The solutions provided herein can improve responsiveness, e.g. in part by providing feedback from the late-warp. Though some fundamental issues of the game simulation running at different times can remain, such as paradoxical events and different reaction times (see above game event decision discussion), game designers can choose a balance between responsiveness per individual user or stability on multi-user game states.

Implementation of the features disclosed herein can include a change in, for example, software development kits (SDKs), such as a GeForce Now (GFN) SDK available from Nvidia Corporation. Game engines, including cloud-based engines, can also be reconfigured for rendering and game state calculating. In some examples, an OS driver API can be updated to provide additional inputs specifying user position. GPUs for gaming (hardware acceleration of late warp) and GFN service can also be updated to include/provide the features disclosed herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured means, for example, designed, constructed, or programmed, with the necessary logic and/or features for performing a task or tasks.

Various aspects of the disclosure can be claimed including the systems and methods as noted in the summary. Each of the aspects noted in the summary may have one or more of the elements of the dependent claims presented below in combination.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

A network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. In addition to previous examples not as a limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Those skilled in the art to which this application relates will appreciate that other and further additions, deletions, substitutions and modifications may be made to the described embodiments.

What is claimed is:

1. A display, comprising:
a screen for displaying a screen image; and
imaging hardware configured to generate a warped image by warping a portion of a rendered image based on a late latch input, wherein the screen image includes the warped image and the portion is determined based at least on a frame rate of the display.

2. The display as recited in claim 1, further comprising a memory configured to store rendered images for generating the screen image, wherein the rendered images include the rendered image for the warping and at least one other image for non-warping.

3. The display as recited in claim 2, further comprising compositing hardware configured to generate the screen image by compositing the warped image and the at least one other image.

4. The display as recited in claim 3, wherein the imaging hardware is integrated with the compositing hardware.

5. The display as recited in claim 1, wherein the display is a monitor.

6. The display as recited in claim 1, wherein the warping is rotational warping based on the late latch input.

7. The display as recited in claim 1, wherein the portion is defined by a geometric shape associated with a center of the rendered image.

8. The display as recited in claim 1, wherein the portion excludes 2D content of the rendered image.

9. The display as recited in claim 1, wherein the imaging hardware is further configured to resolve discontinuities between the portion that is warped and remaining portion of the rendered image that is not warped.

10. The display as recited in claim 9, wherein the imaging hardware is configured to resolve the discontinuities by performing a linear interpolation between an index of the portion and an index of the remaining portion.

11. The display as recited in claim 1, wherein the imaging hardware performs the warping by changing image look-up indexing for the portion.

12. The display as recited in claim 1, wherein the imaging hardware is configured to perform the warping based on an input device parameter of an input device providing the late latch input.

13. A method of rendering employing imaging hardware proximate a display, comprising:
receiving, at the imaging hardware, a rendered image based on a user input from an input device and scene data from an application engine;
receiving, at the imaging hardware, a late latch input from the input device; and
rendering, by the imaging hardware, a warped image by warping at least a portion of the rendered image based on the late latch input and a frame rate of the display.

14. The method as recited in claim 13, wherein the rendering includes resolving discontinuities between the portion that is warped and remaining portion of the rendered image that is not warped.

15. The method as recited in claim 13, further comprising generating a screen image for the display by compositing the warped image with a non-warped image.

16. A method of operating an imaging system employing late latching and late warping, comprising:
rendering, using one or more processors, a rendered image based on a user input from an input device and scene data from an application engine;
obtaining a late latch input from the input device;
rendering, employing imaging hardware that is different, a warped image by late warping at least a portion of the rendered image based on the late latch input and a frame rate of a display; and
updating state information in the application engine with late latch and warp information.

17. The method as recited in claim 16, further comprising making event decisions based on the late latch and warp information.

18. The method as recited in claim 17, wherein making the event decisions occurs in the application engine or in a multi-user server associated with the application engine.

19. The method as recited in claim 17, further comprising evaluating events and sending results of the evaluating to the application engine or multi-user server for validating the results and making the event decisions.

20. The method as recited in claim 19, wherein sending the results of the evaluating is via a local client device.

21. A method of displaying scenes of a video game to improve a user's experience while playing, comprising:
creating a new scene of a video game, for display on a screen, using at least one processor of a computer and a first input from a user that is playing the video game;
receiving a second input from the user during the creating of the new scene;
adjusting the new scene using the second input from the user and a circuit located proximate the screen, wherein the screen is part of a display and the adjusting is based on a frame rate of the display;
displaying the adjusted scene on the screen; and
updating information about the video game using the second input and the adjusted scene.

22. The method as recited in claim 21, wherein the circuit is located in the display.

23. The method as recited in claim 22, wherein the first and second inputs are from a single input device used by the user to interact with the video game, and the circuit receives the second input directly from the input device.

24. The method as recited in claim 21, wherein the adjusting is for rotation associated with the user while playing the video game.

25. The method as recited in claim 21, wherein the adjusting includes only part of the new scene.

26. The method as recited in claim 25, wherein the adjusting includes blending between part of the new scene that is adjusted and part of the new scene that is not adjusted.

27. The method as recited in claim 21, wherein the first input and the second input correspond to interactions of the user with objects of a current scene of the video game displayed on the screen, wherein the second input is received after the first input.

* * * * *

UNITED STATES PATENT AND TRADEMARK OFFICE
CERTIFICATE OF CORRECTION

| | |
|---|---|
| PATENT NO. | : 11,660,535 B2 |
| APPLICATION NO. | : 16/942951 |
| DATED | : May 30, 2023 |
| INVENTOR(S) | : Pyarelal Knowles et al. |

It is certified that error appears in the above-identified patent and that said Letters Patent is hereby corrected as shown below:

In the Claims

In Column 24, Line 29, Claim 16, after --,employing imaging hardware-- delete "that is different"

Signed and Sealed this
Twenty-ninth Day of August, 2023

Katherine Kelly Vidal
*Director of the United States Patent and Trademark Office*